United States Patent [19]

Ardelt et al.

[11] Patent Number: 5,044,812
[45] Date of Patent: Sep. 3, 1991

[54] SEALED AND LUBRICATED PIVOT PIN ASSEMBLY AND METHOD

[75] Inventors: Clarence A. Ardelt, Wheaton; Jack M. Deli, Winfield, both of Ill.

[73] Assignee: Dresser Industries, Inc., Dallas, Tex.

[21] Appl. No.: 468,711

[22] Filed: Jan. 23, 1990

[51] Int. Cl.$^5$ .................................................. F16C 11/00
[52] U.S. Cl. ...................................... 403/154; 403/158; 403/162
[58] Field of Search .............. 403/158, 157, 154, 155, 403/156, 161–163, 39, 288, 16

[56] References Cited

U.S. PATENT DOCUMENTS

| | | |
|---|---|---|
| 2,699,974 | 1/1955 | Deffenbaugh . |
| 3,392,984 | 7/1968 | Reinsma et al. . |
| 3,409,336 | 11/1968 | Dadds . |
| 3,841,718 | 10/1974 | Reinsma . |
| 4,030,730 | 6/1977 | Maguire . |
| 4,089,531 | 5/1978 | Roley et al. . |
| 4,094,516 | 6/1978 | Morley et al. . |
| 4,096,957 | 6/1978 | Iverson et al. . |
| 4,126,359 | 11/1978 | Holze . |
| 4,132,418 | 1/1979 | Roli . |
| 4,150,856 | 4/1979 | Hakkenberg et al. . |
| 4,163,589 | 8/1979 | Fox et al. ........................ 403/155 X |
| 4,179,130 | 12/1979 | Fass et al. . |
| 4,188,146 | 2/1980 | Stecklein ............................ 403/158 |
| 4,209,204 | 6/1980 | Wagner et al. . |
| 4,243,341 | 1/1981 | Kabay et al. . |
| 4,248,439 | 2/1981 | Haslett . |
| 4,251,182 | 2/1981 | Schroeder . |
| 4,262,914 | 4/1981 | Roley . |
| 4,274,682 | 6/1981 | Livesay . |
| 4,275,890 | 6/1981 | Reinsma . |
| 4,288,172 | 9/1981 | Livesay et al. . |
| 4,295,654 | 10/1981 | Kawamura et al. . |
| 4,331,339 | 5/1982 | Reinsma . |
| 4,364,572 | 12/1982 | Yamamoto et al. . |
| 4,398,862 | 8/1983 | Schroeder . |
| 4,400,898 | 8/1983 | Christensen et al. . |
| 4,457,521 | 7/1984 | Morley . |
| 4,469,336 | 9/1984 | Linne . |
| 4,507,005 | 3/1985 | Siewert et al. ........................ 403/16 |
| 4,652,167 | 3/1987 | Garman ............................... 403/158 |
| 4,772,150 | 9/1988 | Horton ................................ 403/39 |
| 4,858,962 | 8/1989 | Bolling et al. ..................... 403/39 X |

FOREIGN PATENT DOCUMENTS 8200181 1/1982 PCT Int'l Appl. ................ 403/161

Primary Examiner—Peter M. Cuomo

[57] ABSTRACT

A sealed and lubricated pivot pin assembly and method for joining linkage components in earth-moving machinery. The pivot pin assembly includes a pivot pin subassembly, a pair of spacer rings, a pair of track chain type annular seals, an end cap subassembly, and a releasable fastener. The spacer rings simplify joint assembly by setting up and controlling the proper squeeze on the annular seals, preventing crushing of the annular seals during torquing of the releasable fastener, and controlling the set-up length of the assembled joint so that no shimming is required. Each of the pivot pin and end cap subassemblies include an end sleeve which extends beyond the joint clevis or brackets a sufficient distance to allow the pivot pin assembly to float axially and, thereby, compensate for minor deflections in the joint members. The pivot pin assembly is symmetrical in that the pivot pin and end cap subassemblies have common dimensions which permit the pivot pin assembly to be installed from either side of a joint.

24 Claims, 2 Drawing Sheets

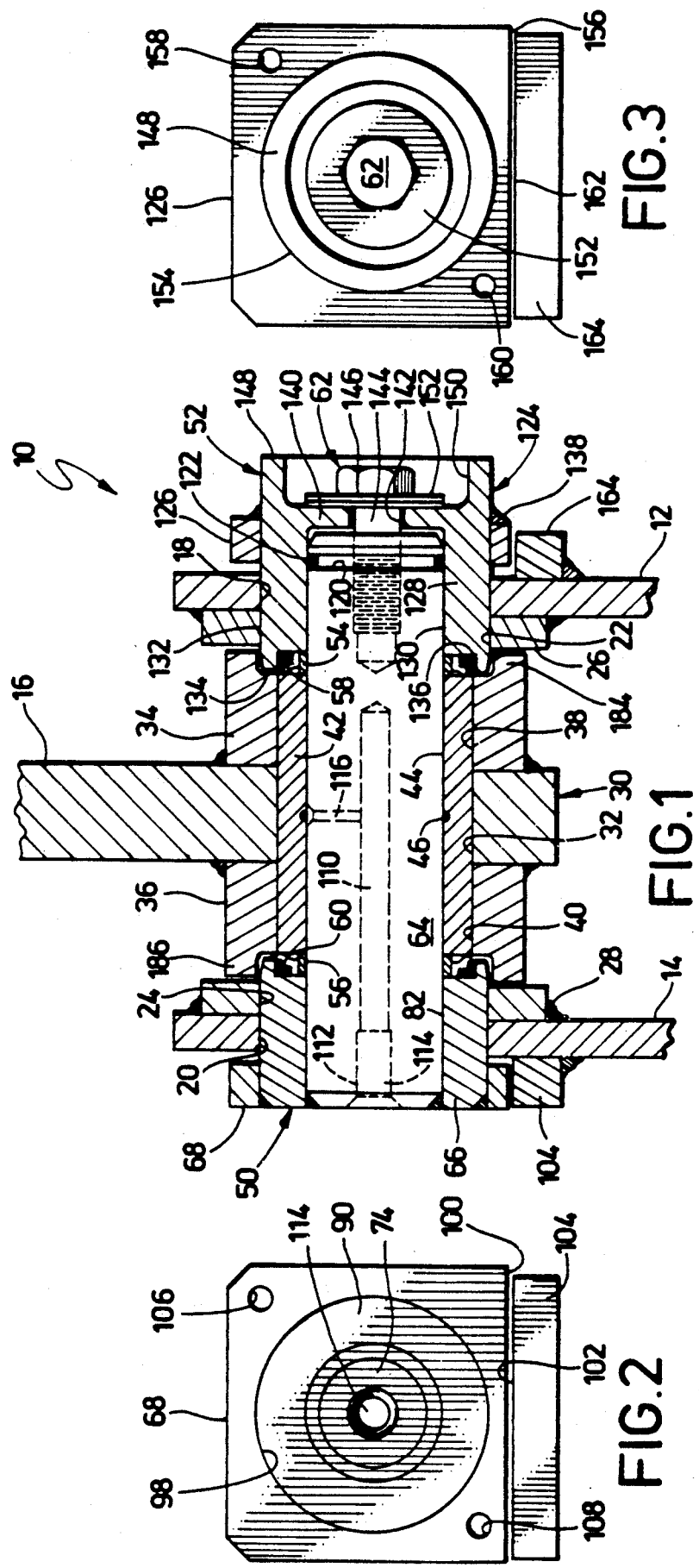

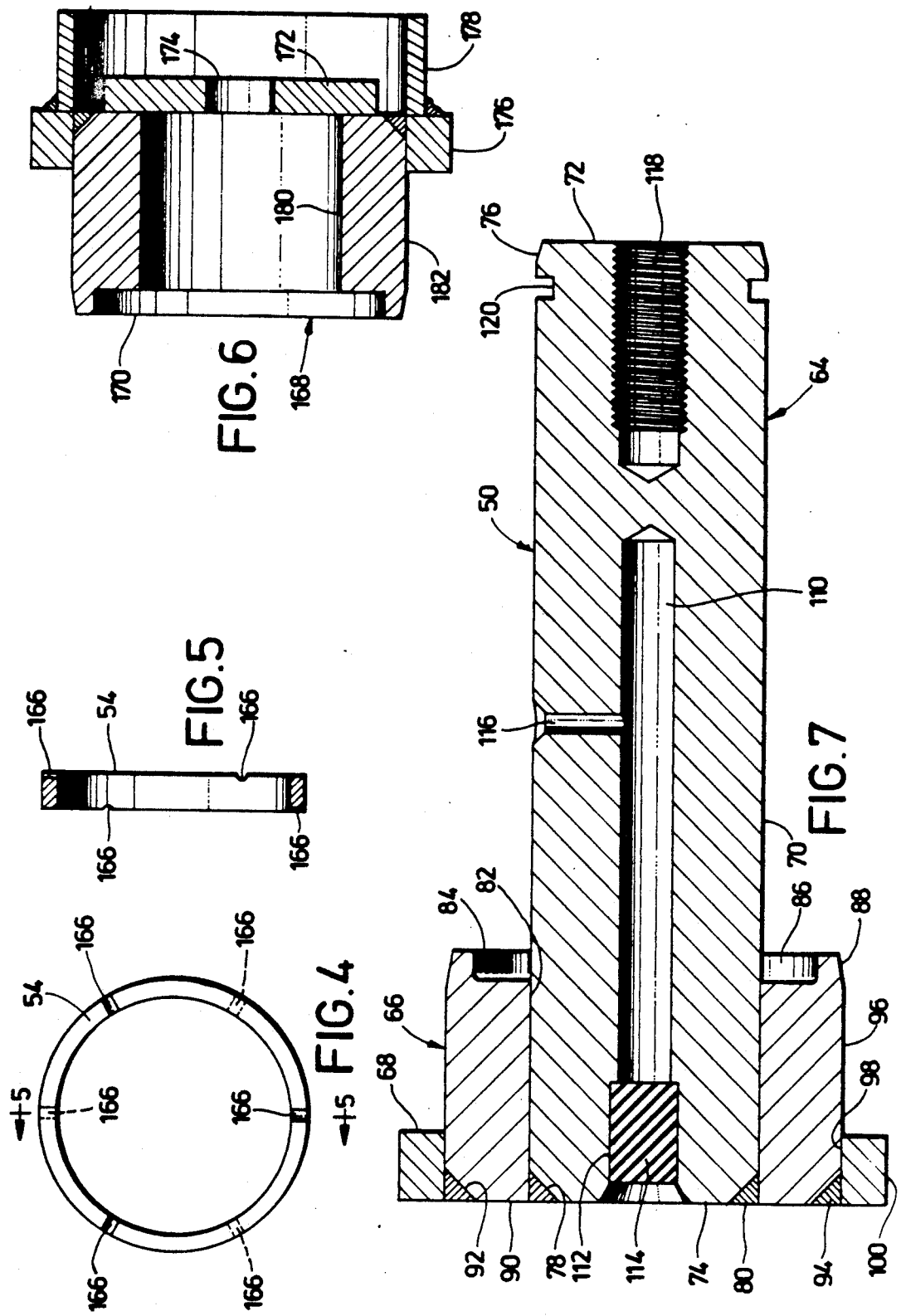

SEALED AND LUBRICATED PIVOT PIN ASSEMBLY AND METHOD

BACKGROUND OF THE INVENTION

This invention relates to sealed and lubricated pivot pins and, more particularly, it concerns such a pivot pin assembly for use in pivoting joints in linkage components of earth-moving equipment.

Typically, loader buckets for earth-moving equipment have vertical plate-like brackets or lugs extending from the back side of the bucket. These brackets are connected to an eye in the end of a loader arm or boom by a transverse pivot pin as shown, for example, in U.S. Pat. Nos. 4,188,146 issued to G. L. Stecklein on Feb. 12, 1980, 4,243,341 issued to S. Kabay et al on Jan. 6, 1981, and 4,400,898 issued to R. B. Christensen on Aug. 30, 1983.

Conventionally, the pivot pin is restrained from rotating relative to the bucket brackets in order to eliminate wear between the pivot pin and the brackets Relative rotation does occur between the eye of the loader arm and the pivot pin. As such, a cylindrical bushing is fixed within the eye of the loader arm and lubrication is provided between the bushing and the pivot pin. In order to keep the bushing lubricated and to keep contaminants and debris from getting between the bushing and the pivot pin, annular seals are provided adjacent each end of the bushing. Examples of such sealed and lubricated pivot pin arrangements are disclosed in U.S. Pat. Nos. 4,096,957 issued to C. P. Iverson et al on June 27, 1978, 4,251,182 issued to W. L. Schroeder on Feb. 17, 1981, and 4,398,862 issued to W. L. Schroeder on Aug. 16, 1983.

Other common pivoting joints in the linkage of earth-moving equipment, such as, loader arm to loader frame and lift cylinder to loader frame, are also adapted to the use of sealed and lubricated pivot pins. All of these pivoting joints and especially the loader arm to bucket joint are subjected to extreme conditions during operation of the equipment. Thus, these joints must be periodically lubricated to flush out contaminants such as grit and moisture and to insure proper lubrication in order to reduce wear and corrosion of the moving parts.

In recent years, more reliable sealing methods have been developed and lubricant reservoirs have been added in order to extend the time interval for required relubrication of the joints. For example, U.S. Pat. No. 4,772,150 issued to L. A. Horton on Sept. 20, 1988 discloses a pin assembly including an improved seal and reservoir arrangement.

One problem associated with a large number of the existing sealed and lubricated pivot pin assemblies is that they require the use of shims during assembly to establish proper clearances between the seals and their mating surfaces. The use of shims to correct for manufacturing tolerances, variations between different makes and models of machinery, and the like not only makes joint assembly time consuming, but also makes the use of the proper number and size of shims and, as such, the skill of the assembler critical to the success of the seals and of the joint itself.

Another problem associated with many of the conventional pivot pin designs is that they are sensitive to axial defections of the bucket brackets or lugs so that even a small amount of deflection can cause one of the seals to leak A leaking pivot pin seal can lead to early replacement of the pivot pin assembly because it allows water and grit in between the pin and bushing and also because it permits lubricant to escape.

Many of the commercially available pivot pin designs also suffer from other drawbacks, such as, requiring tapped holes in at least one of the bucket brackets to attach the pivot pin to the bracket, requiring both the pivot pin and bushing to be replaced during joint servicing, requiring disassembly of the joint in order to relubricate the contact surfaces between the pin and bushing, are not symmetrical in design and, as such, do not allow for assembly from either side of the joint, requiring the pivot pin and bushing as a unit to be pressed or interference fit into the eye of the loader arm to assure rotation between the pin and bushing rather than the bushing and the loader arm eye, and/or relying on the body of the loader arm as a contact surface rather than the bushing.

In light of the foregoing, there is a need for an improved pivot pin assembly which addresses the above-mentioned problems and drawbacks associated with current sealed and lubricated pivot pin arrangements.

SUMMARY OF THE INVENTION

In accordance with the present invention, the problems and drawbacks associated with conventional pivot pin arrangements are substantially overcome by a sealed and lubricated pivot pin assembly and method for connecting linkage components in earth-working machinery by which the time interval for relubrication of the joints is substantially increased, which does away with the need for the use of shims during assembly, and which compensates for minor axial deflections in the outer lug or bracket members of the joint by allowing the pivot pin assembly to float axially relative to both bracket members.

The present invention is particularly though not exclusively adapted to be used in the pivoting joints in the linkage of earth moving equipment. For example, the sealed and lubricated pivot pin assembly of the present invention is especially suited for connecting a bucket to a loader arm of a crawler loader.

In accordance with a preferred embodiment, the sealed and lubricated pivot pin assembly of the present invention includes a pivot pin subassembly, an end cap subassembly, a pair of spacer rings, a pair of annular seals, and a releasable fastener. The preferred annular seals are a proven design used in the joints of sealed and lubricated crawler tractor track chains.

The spacer rings of the present invention have three functions: first, to set up and control the proper squeeze or deflection on the annular seals in order to provide the correct contact force between the lip of the seal and the surface on which it rides; second, to prevent crushing of the annular seals during joint assembly; and, third, to provide a positive stop which controls the set-up length of the assembled joint so that no shimming is required.

A principal object of the present invention therefore is the provision of a sealed and lubricated pivot pin assembly by which the time interval for relubrication of the pivot pin assembly is increased due to the sealing out of contaminants, which provides a reservoir of lubricant for the moving parts, and which provides for axial pin movement to compensate for minor deflections in adjacent bracket or clevis members and, thereby, maintain seal integrity. Another object of the present invention is the provision of such a pivot pin assembly which is easy to install and substantially symmetrical in design so that it can be assembled from either side of a joint.

Another and more particular object of the present invention is the provision of a pivot pin assembly which incorporates a labyrinth of interfitting annular flanges and recesses which prevent the deleterious scouring action of dirt and other foreign material on the sealing surfaces Yet still another object of the present invention is the provision of a pivot pin assembly which includes a pair of spacer rings by which proper sealing is assured, seal life is increased, and assembly installation time is decreased. Other objects and further scope of applicability of the present invention will become apparent from the detailed description to follow taken in conjunction with the accompanying drawings in which like parts are designated by like reference characters.

BRIEF DESCRIPTION OF THE DRAWINGS

FIG. 1 is a partial cross section illustrating an exemplary embodiment of the sealed and lubricated pivot pin assembly of the present invention;

FIG. 2 is a partial end view representing one end of the pivot pin assembly of FIG. 1;

FIG. 3 is a partial end view illustrating the other end of the pivot pin assembly of FIG. 1;

FIG. 4 is an enlarged, side view representing one of the spacer rings of the pivot pin assembly of FIG. 1;

FIG. 5 is a cross section of the spacer ring of FIG. 4 taken along line 5—5;

FIG. 6 is an enlarged cross section representing an alternative embodiment of an end cap subassembly; and FIG. 7 is an enlarged, cross section illustrating the pivot pin subassembly of FIG. 1.

DETAILED DESCRIPTION OF THE PREFERRED EMBODIMENTS

In FIG. 1 of the drawings, an exemplary embodiment of the sealed and lubricated pivot pin assembly of the present invention is generally designated by the reference numeral 10 and shown pivotally connecting a pair of bucket brackets or lugs 12 and 14 to one end of a loader arm or boom 16. Although the pivot pin assembly of the present invention is shown in FIG. 1 and hereinbelow described in relation to the connection of a loader arm to a clevis or bracket pair of a bucket, it is to be understood that the present invention is applicable to other pivoting joints in the linkage of earth-working machinery, such as, loader arm to loader frame, lift cylinder to loader frame, lift cylinder to loader arm, loader arm to bell crank, bell crank to bucket cylinder, bell crank to bucket link, bucket link to bucket, and bucket cylinder to loader frame.

Each of the bucket lugs 12 and 14 have circular openings 18 and 20 axially aligned with each other and with a circular opening 22 and 24 in respective plates 26 and 28 attached to the inner surface of each of the lugs 12 and 14. A lower end or eye 30 of the loader arm 16 includes a circular bore 32, a pair of reinforcement hubs 34 and 36 each having a central opening 38 and 40 which is coaxial with and of the same diameter as the bore 32. A cylindrical bushing 42 is pressed or interference fit into the coaxial openings 32, 38 and 40 of the loader arm eye 30 and hubs 34 and 36 in a manner which insures that the bushing 42 is fixed to the loader arm 16 and, as such, does not rotate relative to the loader arm. The bushing 42 has an axial through hole 44 which is coaxial with the openings 18, 20, 22 and 24 in the bucket brackets 12 and 14 when the joint is fully assembled as shown in FIG. 1. The through hole 44 includes a small, central, annular groove 46 which provides for the flow of lubricant as will be described in greater detail below.

The pivot pin assembly 10 of the present invention includes as major components a pivot pin subassembly 50, an end cap subassembly 52, a pair of spacer rings 54 and 56, a pair of corresponding annular seals 58 and 60 and a releasable fastener 62.

With reference to FIGS. 1, 2 and 7 of the drawings, the pivot pin subassembly 50 includes an elongate pivot pin 64, a cylindrical end sleeve 66, and a substantially rectangular end plate 68. The pivot pin 64 has a substantially cylindrical outer surface 70 and planar end faces 72 and 74 defining opposite ends of the pin. Each of the end faces 72 and 74 have beveled edges 76 and 78, respectively. The beveled edge 76 of the pin 64 facilitates both insertion of the pivot pin within the cylindrical through hole 44 of the bushing 42 and placement of the end cap subassembly 52 over the end 72 of the pin 64. The beveled edge 78 on the other end of the pin 64 provides for the attachment of the end sleeve 66 to the pivot pin 64 by an oil tight weld 80.

The end sleeve 66 includes a central cylindrical bore 82 which is sized to produce a snug fit with the cylindrical outer surface 70 of the pivot pin 64. The end sleeve 66 has an inner end face 84 which includes a counter bore 86 adapted to receive the spacer ring 56 and the annular seal 60. The outer edge of the end face 84 is beveled at 88 to facilitate insertion of the end sleeve 66 through the cylindrical openings 20 and 24 in the lug number 14 and reinforcement plate 28, respectively. The end sleeve 66 has a radial outer end face 90 having a beveled edge 92 which provides for the attachment of the end plate 68 to the end sleeve 66 by a weld 94. The end sleeve 66 includes a cylindrical outer surface 96 which fits snugly within the cylindrical bores 20 and 24 of the bracket 14 and the reinforcement plate 28, respectively. The portion of the outer surface 96 of the end sleeve 66 which is designed to come into contact with the bracket member 14 and the reinforcement plate 28 (including the beveled edge 88) is chromium plated and baked for a time after plating in order to be free from hydrogen embrittlement. For example, this surface is chromium plated (electroplated) with at least a minimum thickness of 1.00 mils (25 $\mu$m) and an average thickness of about 1.50 mils (38 $\mu$m) of hard chromium and then baked for four hours at 177° C.

The end plate 68 includes a central opening 98 sized to give a snug fit with the cylindrical outer surface 96 of the end sleeve 66. The end plate 68 has a planar lower surface 100 which cooperates with a planar upper surface 102 on a stop bar 104 which is fixedly attached to the outer surface of the bracket 14 in order to prevent rotation of the end plate 68, end sleeve 66 and pivot pin 64 relative to the bracket 14. The end plate 68 includes a pair of threaded openings 106 and 108 on opposite sides of the opening 98 to facilitate removal of the pivot pin subassembly 50 from the joint as will be described in greater detail later As shown most clearly in FIGS. 1 and 7 of the drawings, the pivot pin 64 includes a lubricant reservoir in the form of an axially extending cylindrical bore 110 having a counter bore 112 which accommodates a resilient plug 114. The pivot pin 64 also includes a radially extending lubricant hole 116 which intersects with the lubricant reservoir 110 and extends through the outer surface 70 of the pivot pin 64 in the area of the lubricant groove 46 in the loader arm bushing 42. The pivot pin 64 includes a threaded axial opening 118 extending from the pin face 72 inwardly along the axis of the pivot pin 64 and dimensioned to receive the threaded fastener 62. Lastly, the pivot pin 64 has a circumferential groove 120 located adjacent the end 72 and adapted to receive an O-ring type sealing element 122 (FIG. 1).

As shown in FIGS. 1 and 3 of the drawings, the end cap subassembly generally designated 52 includes an end cap 124 and an end plate 126. The end cap 124 includes a cylindrical section 128 which defines an end sleeve having inner and outer cylindrical surfaces 130 and 132 which correspond to the inner and outer surfaces 82 and 96 of the other end sleeve 66. Further, the end sleeve 130 has an inner end face 134 having a counter bore 136 with the same dimensions as the counter bore 86 in the other end sleeve 66. The counter bore or recess 136 is adapted to receive the spacer ring 54 and the annular seal 58 (FIG. 1). The outer edge of the end face 134 is beveled to facilitate insertion of the end sleeve 128 through the openings 18 and 22 in the lug member 12 and reinforcing plate 26, respectively.

The portion of the sleeve outer surface 132 which is designed to come into contact with the bracket member 12 and plate 26 is chromium plated (electroplated) with at least a minimum thickness of 1.00 mils (25 $\mu$m) and an average thickness of about 1.50 mils (38 $\mu$m) of hard chromium and baked for a time after plating to reduce hydrogen embrittlement. For example, this surface is chromium plated and then it is baked for four hours at 177° C.

The end plate 126 is attached to the outer surface 132 of the end sleeve 128 by a weld 138. The end plate 126 is spaced a sufficient distance away from the bracket member 12 to permit axial movement of the pivot pin assembly 10 and, thereby, compensate for deflection of bracket member 12.

The end cap 124 also has a planar section 140 defining a lateral end face which covers the end 72 of the pivot pin 64 except for a central opening 142. The threaded fastener 62 has a shaft 144 which passes through the opening 142 and a head 146 which is larger than the opening 142.

Further, the end cap 124 includes an annulus 148 which extends beyond the planar section 140 a sufficient distance to form a recess 150 which accommodates the fastener head 146 and a pair of lock washers 152. The annular extension or flange 148 serves to protect the fastener head 146 from, for example, falling debris It is preferred that the lock washers 152 are spring type washers generally known as Belleville spring washers which resemble the frustum of a cone when relaxed and are oriented with the cone angle converging away from the pivot pin 64.

As shown most clearly in FIG. 3 of the drawings, the end plate 126 corresponds to the end plate 68 and includes a central opening 154, a planar lower edge 156, and a pair of threaded openings 158 and 160. The lower edge 156 of the end plate 126 cooperates with a planar upper surface 162 of a stop bar 164 fixedly attached to the outer surface of the bracket member 12 to impede rotation of the end cap subassembly 52 relative to the bracket member 12.

As shown in FIGS. 4 and 5 of the drawings, each of the spacer rings or thrust washers 54 and 56 (only one being shown for the sake of brevity) includes a plurality of shallow arcuate grooves 166 in each end face to provide for lubricant flow around the spacer rings when the joint is fully assembled (FIG. 1). The grooves 166 are equispaced at 120° and the grooves on one side of the ring are offset by 60° with respect to the grooves on the other side. It is preferred that the spacer rings 54 and 56 be made from a powdered metal which is impregnated with a bonded lubricant. For example, the rings 54 and 56 are formed from a powdered metal designated by the International Hough Code FN-0205-S which is based on the Metal Powder Industries Federation (MPIF) system. The codes are based on chemistry and are further classified by density using suffix letters. The prefix letters indicate alloy type. The four digit numbers indicate the amounts of major alloy element and carbon. The suffix letter indicates the density range. The powdered metal FN-0205-S has an approximate ASTM code number B464, Grade 1, Class B, and Type II, a chemical composition of 0.3 to 0.6% carbon, 2.5% maximum of copper, 1.0 to 3.0% nickel with the balance being iron but may contain small percentages of manganese, molybdenum, and chromium, and has a density range of 6.8 to 7.2 grams per cubic centimeter with a preferred density of 7 g/cm$^3$ and an apparent hardness RC 38046.

With reference to FIG. 6 of the drawings, an alternative embodiment of an end cap subassembly is generally designated by the reference numeral 168 and shown to include an end sleeve 170, a planar metal washer 172 having a central opening 174, an end plate 176, and a cylindrical extension 178. The end cap subassembly 168 corresponds in dimension to the end cap subassembly 52 of FIG. 1. For example, the end sleeve 170 has inner and outer surfaces 180 and 182 defining inner and outer diameters which are the same as those defined by the surfaces 130 and 132 of the end sleeve 128. The end cap subassembly 168 has an inherent manufacturing efficiency and economy in that the end sleeve 170 may be an end sleeve exactly like the end sleeve 66 of the pivot pin subassembly 50.

The annular seals 58 and 60 (FIG. 1) are preferably proven track pin seals customarily used, for example, in the joints of crawler tractor track chains. Examples of such seals are described in U.S. Pat. Nos. 4,094,516 issued to J. P. Morley et al on June 13, 1978 and 4,457,521 issued to J. P. Morley on July 3, 1984 which are hereby incorporated by reference. One such seal especially suited for this purpose is a "GS" type track pin seal manufactured by CR Industries of Elgin, Ill.

With reference to FIG. 1 of the drawings, each of the loader arm hubs 34 and 36 includes a respective annular extension or flange 184 and 186 which extends beyond the lateral end faces of the cylindrical bushing 42 and overlies the inner ends 84 and 134 of the end sleeves 66 and 128, respectively. As such, a labyrinth of flanges and recesses protects the annular seals 58 and 60 by preventing direct scouring action of dirt and other foreign material on the sealing surfaces In accordance with the preferred embodiment of the present invention, installation of the pivot pin assembly 10 first entails the production of the pivot pin subassembly 50 and the end cap subassembly 52 by, for example, welding the respective components together using welding jigs especially suited for that purpose. Next, the spacer ring 56 is slid over the end 72 of the pivot pin 64 and up against the base of the counter bore 86. Then, the annular seal 60 is placed over the end 72 of the pivot pin 64 and fit within the counter bore 86 along with the spacer ring 56.

Thereafter, the bracket members 12 and 14 and the loader arm 30 are positioned relative to each other so that the through hole 44 and the openings 18, 22, 20 and 24 are coaxially aligned. Next, the end 72 of the pivot pin 64 is inserted through the openings 20 and 24 in the bracket member and plate 14 and 28, respectively, the through hole 44 in the cylindrical bushing 42, and the openings 22 and 18 in the plate 26 and bracket member 12 so as to be positioned as shown in FIG. 1. In this position, the spacer ring 56 is sandwiched between the end sleeve 66 and one end face of the bushing 42.

Next, the spacer ring 54 is slipped over the end of 72 and the pivot pin 64 and up against the other end face of the bushing 42. Then, the annular seal 58 is fit within the counter bore 136 of the end cap subassembly 52 which at this point is still separate from the rest of the joint. Next, an o-ring 122 is placed in the circumferential groove 120 in the pivot pin 64.

Now the joint is ready for placement of the end cap subassembly 52 over the end 72 of the pivot pin and through the openings 18 and 22 in the bracket member 12 and plate 26, respectively. The end cap subassembly 52 is inserted into the joint to the point shown in FIG. 1 whereat the spacer ring 54 is sandwiched between the end sleeve 128 and the other end face of the bushing 42. Next, a loctite compound is applied to the threads of the fastener 62 and the fastener shaft 144 is passed through the pair of Belleville washers 152, through the opening 142, and, then, threaded into the pivot pin opening 118. The threaded fastener 62 is torqued to about 125 ft-lbs, which is a sufficient pressure to maintain the pivot pin in an assembled state without excessively compressing the spacer rings 54 and 56 and the annular seals 58 and 60.

Following the above-described assembly process, lubrication is provided to the contact surfaces between the pin 64, the bushing 42, the seals 58 and 60, and the spacer rings 54 and 56 by inserting a needlelike element through the resilient plug 114, evacuating and then filling with lubricant the lubricant reservoir 110, lubricant flow passage 116, lubricant flow annular trough or groove 46, any space between the pivot pin and bushing through bore 44, the lubricant flow passages 166 in the spacer rings 54 and 56 (FIGS. 4 and 5), and any gaps between the annular seals 58 and 60 and the hardened end faces of the bushing 42. In the practice of the present invention, it is the bushing 42 which moves relative to the pivot pin 64, spacer rings 54 and 56, and annular seals 58 and 60. Relubrication of the joint merely requires that additional lubricant be added to the reservoir 110 by, for example, again inserting a needle type element through the resilient plug 114 and adding fresh, clean lubricant to the lubricant reservoir 110. The pivot pin assembly of the present invention substantially increases the customary time interval for relubrication by effectively sealing out contaminants and providing a reservoir of lubricant for the moving parts.

Removal of the sealed and lubricated pivot pin assembly 10 of the present invention is accomplished by, first, unscrewing the threaded fastener 62 from the pivot pin 64, second, driving a respective long screw or bolt (not shown)into each of the threaded openings 158 and 160 so as to have the long screws contact the outer surface of the bracket member 12 adjacent the end sleeve 128 and upon further rotation of the long screws cause the end cap subassembly 52 to be eased out of the openings 22 and 18 in the reinforcement plate 26 and bracket member 12, respectively, and, third and lastly, driving respective long screws into each of the threaded openings 106 and 108 in the end plate 68 to contact the outer surface of the bracket member 14 adjacent the end sleeve 66 and upon a further rotation cause the pivot pin subassembly 50 to be eased out of the bushing through bore 44, and the openings 24 and 20 in the reinforcement plate and bracket member 14, respectively.

Thus, it will be appreciated that as a result of the present invention, a highly effective sealed and lubricated pivot pin assembly and method is provided by which the principal object and others are completely fulfilled. It is contemplated and will be apparent to those skilled in the art from the foregoing description and accompanying drawing illustrations that variations and/or modifications of the disclosed embodiments may be made without departure from the invention. Accordingly, it is expressly intended that the foregoing description and accompanying drawings are illustrative of preferred embodiments only, not limiting, and that the true spirit and scope of the present invention be determined by reference to the appended claims.

What is claimed is:

1. A sealed and lubricated pivot pin assembly for use in connecting linkage components such as a pair of bracket members of a bucket and an eye of a loader arm of an earth-working vehicle, the inner surface of the eye in the loader arm being defined by a cylindrical bushing having first and second end faces, said pivot pin assembly comprising:

a substantially cylindrical pivot pin having first and second ends, a first annular end sleeve fixedly attached to said first end of said pivot pin and having an inner dimension which conforms to the periphery of said pivot pin in the area of said first end and an outer dimension which substantially conforms to a circular opening in one of said bracket members, a pair of spacer rings each having an inner diameter which conforms to the periphery of said pivot pin in the areas adjacent the end faces of said cylindrical bushing and an outer diameter which is less than that of said cylindrical bushing, first and second annular seals each having an inner surface which corresponds to the outer diameter of a respective one of said spacer rings and a laterally protruding surface adapted to contact a respective end face on said cylindrical bushing in a manner providing a lubricant tight seal therewith.

an end cap having a cylindrical section defining a second annular end sleeve having an inner dimension which conforms to the periphery of said pivot pin in the area of said second end and an outer dimension which substantially conforms to a circular opening in the other of said bracket members, said end cap having a planar section defining a lateral end face overlying said second end of said pivot pin and having a central opening for accommodating a threaded fastener for releasably fastening said end cap to said pivot pin, said pivot pin including a threaded central opening for receiving said threaded fastener to a point whereat said pivot pin assembly joins said linkage components and each of said spacer rings defines the gap between the inner end of each of said first and second end sleeves and said first and second end faces of said cylindrical bushing and thereby determines the compression applied to each of said first and second annular seals, a lubricant tight seal provided between said pin and said end cap in the are of said second end of said pivot pin, wherein each of said first and second end sleeves extends beyond the respective bracket members to provide for axial movement of the pivot pin assembly relative to said bracket members, first and second substantially rectangular end plates each being fixedly attached to one of said first and second end sleeves, respectively, exterior to said bracket members and spa ed from said bracket members to allow for axial movement of the pivot pin assembly relative to said bracket members and accommodate axial deflection of said bracket members, and wherein said pivot pin assembly is symmetrical in that the outer and inner dimensions of said first and second end sleeves are substantially the same so as to accommodate installation of said pivot pin assembly from either side of said bracket members.

2. The pivot pin assembly of claim 1, further comprising:

respective stop bars fixedly attached to said bracket members adjacent at least one edge of each of said end plates to prevent rotation of said end plates, said first and second end sleeves, and said pivot pin relative to said bracket members.

3. The pivot pin assembly of claim 2, wherein said threaded fastener is a bolt having a threaded shaft and a head having an outer dimension larger than said central opening in said planar section of said end cap and wherein said end cap includes an annulus extending beyond said planar section a sufficient distance to protect the head of said bolt.

4. The pivot pin assembly of claim 3, wherein said pivot pin includes a lubricant reservoir in the form of a central bore extending from said first end to the interior of said pivot pin along the central axis thereof, a radial lubricant passage extending from said central bore to the outer surface of said pivot pin in the area of said cylindrical bushing, and a resilient plug for plugging said central bore adjacent said first end of said pivot pin.

5. The pivot pin assembly of claim 4, wherein each of said spacer rings includes at least one radial groove across at least one end face thereof to provide for lubricant flow around said spacer rings.

6. The pivot pin assembly of claim 5, wherein said at least one radial groove comprises a plurality of grooves in each end face of each of said spacer rings.

7. The pivot pin assembly of claim 6, wherein said plurality of grooves are equispaced on each end face with those on one end face being offset from those on the other end face of each said spacer ring.

8. The pivot pin assembly of claim 7, wherein said spacer rings are formed of a powdered metal vacuum impregnated with a bonded lubricant.

9. The pivot pin assembly of claim 4, wherein said annular seals are track pin type seals.

10. The pivot pin assembly of claim 4, wherein the outer surfaces of said first and second end sleeves which contact said bracket members are chromium plated and treated so as to be substantially free from hydrogen embrittlement.

11. The pivot pin assembly of claim 4, wherein each of said end plates includes at least a pair of threaded openings with each opening of said pair being on opposing sides of said first and second end sleeves, respectively, to provide for the removal of said pivot pin assembly from a joint.

12. The pivot pin assembly of claim 4, wherein at least one spring type washer serves as a lock washer for maintaining said threaded fastener in an end cap retaining position.

13. The pivot pin assembly of claim 12, wherein said at least one spring type washer comprises a plurality of washers oriented so as to resist insertion of said threaded fastener as it is brought up against said planar section of said end cap.

14. The pivot pin assembly of claim 4, wherein said second end sleeve section, said planar section and said annulus extension of said end cap are an integral unit.

15. The pivot pin assembly of claim 4, wherein said planar section of said end cap comprises a thick metal washer having an outer diameter sufficient to provide for a portion of said washer to overlie a portion of the exterior end face of said second end sleeve section of said end cap.

16. The pivot pin assembly of claim 4, wherein said lubricant tight seal between said pivot pin and said end cap comprises an O-ring positioned in a circumferential groove in said pivot pin adjacent said second end of said pivot pin.

17. The pivot pin assembly of claim 4, wherein said pivot pin, said first end sleeve, and said first end sleeve end plate form an integral pivot pin subassembly.

18. The pivot pin assembly of claim 4, wherein said end cap and said second end sleeve end plate form an end cap subassembly.

19. The pivot pin assembly of claim 4, wherein each end face of the eye in the loader arm has an annular flange which extends beyond the end face of said cylindrical bushing and overlies the inner end of one of said first and second end sleeves, respectively, wherein each inner end of said first and second end sleeves includes an annular recess dimensioned to receive one of said spacer rings and one of said first and second annular seals, and wherein said flanges and recesses provide a labyrinth which protects said annular seals from direct detrimental scouring by contaminants.

20. The method of assembling a sealed and lubricated pivot pin assembly between linkage components such as a pair of bracket members and an eye member including a central bushing, said pivot pin assembly including a pivot pin having first and second ends, first and second end sleeves each having like inner and outer dimensions and an annular recess, first and second spacer rings, first and second annular seals, and a threaded fastener comprising the steps of:

attaching said first end sleeve to said first end of said pivot pin using an oil tight weld to thereby form a pivot pin subassembly, sliding said first spacer ring over said second end of said pivot pin and up against said first end sleeve inside of said annular recess, placing said first annular seal over said spacer ring in said annular recess in the first end sleeve, inserting the pivot pin subassembly, first spacer ring and first annular seal through one of the bracket members and the bushing int he eye member to the point whereat the first spacer ring abut one end of the bushing in the eye member, sliding the second spacer ring over said second end of the pivot pin and up against the other end of the bushing in the eye member, placing the second annular seal into an annular recess in one end of the second end sleeve.

inserting the one end of the second end sleeve through the other bracket member a sufficient distance to cause the second annular seal to fit over the second spacer ring and up against the other end of the bushing and to point whereat the second end sleeve abuts with the second spacer ring, fastening the second end sleeve to said pivot pin in a manner maintaining each of said end sleeves in contact with said spacer rings and said spacer rings up against said bushing so that each of said seals are squeezed a predetermined amount between a respective one of said end sleeves and said bushing to ensure a lubrication tight seal without crushing said seals, wherein said pivot pin includes an axially extending threaded opening in the second end thereof an said second end sleeve includes a central opening coaxial with said threaded opening in said pivot pin, and wherein said method step of fastening said second and sleeve to said pivot pin comprises releasably securing said second end sleeve to said pivot pin using a bolt and washer arrangement, attaching a substantially rectangular end plate to each of said firs and second end sleeves at a location providing a gap between said end plates and said bracket members, and preventing rotation of said end sleeves and said pivot pin relative to said bracket members by fixedly attaching a stop bar to each of said bracket members adjacent one edge of each of said end plates.

21. The method of claim 20, wherein said pivot pin includes an axially extending opening in said one end thereof to provide a reservoir for a lubricant, and a radially extending lube hole which allows lubricant in the axial reservoir to reach the surface of the pivot pin int he area of the bushing in the eye member, said method further comprising the step of:

lubricating the contact surfaces between the pivot pin, bushing, spacer rings, and seals by plugging the end of said reservoir, evacuating said reservoir, and then adding a lubricant to said reservoir.

22. The method of claim 21, wherein said reservoir is plugged with a plug of resilient material and wherein said reservoir is evacuated and lubricant is added to said reservoir by inserting a needle through said resilient plug.

23. The method of claim 22, wherein said pivot pin includes circumferential groove adjacent said second end thereof for receiving an O-ring type lubricant seal, and said method further comprises the step of:

installing an O-ring type seal in said circumferential groove in said pivot pin prior to the insertion of the second end sleeve through the other bracket member.

24. The method of claim 23, wherein said bolt and washer arrangement includes a bolt and at least one lock washer, and said method further comprises the step of:

applying a loctite compound to said bolt, threading said bolt into said second end of said pivot pin, and then tightening said bolt to a torque of about 125 ft-lbs.

* * * * *